United States Patent [19]

Hatakeyama

[11] Patent Number: 5,542,079
[45] Date of Patent: Jul. 30, 1996

[54] DATA DRIVEN PROCESSOR FOR READING DATA FROM STORAGE TO APPLY PRESCRIBED OPERATION IN RESPONSE TO OPERATION UPDATING INSTRUCTION AND UPDATING THE CONTENTS OF THE STORAGE

[75] Inventor: Kouichi Hatakeyama, Nara, Japan

[73] Assignee: Sharp Kabushiki Kaisha, Osaka-fu, Japan

[21] Appl. No.: 80,619

[22] Filed: Jun. 22, 1993

[30] Foreign Application Priority Data

Jul. 7, 1992 [JP] Japan .................................. 4-180129

[51] Int. Cl.⁶ .................................................. G06F 15/02
[52] U.S. Cl. ...................... 395/800; 395/375; 395/841; 364/262.9; 364/263; 364/946.2; 364/DIG. 1
[58] Field of Search .................................... 395/275, 375, 395/775, 800, 425, 841

[56] References Cited

U.S. PATENT DOCUMENTS

| | | | |
|---|---|---|---|
| 4,953,083 | 8/1990 | Takata et al. | 395/250 |
| 5,043,880 | 8/1991 | Yoshida | 395/375 |
| 5,093,919 | 3/1992 | Yoshida et al. | 395/800 |
| 5,115,510 | 5/1992 | Okamoto et al. | 395/775 |
| 5,117,499 | 5/1992 | Miyata | 395/800 |
| 5,125,097 | 6/1992 | Okamoto et al. | 395/800 |
| 5,165,036 | 11/1992 | Miyata | 395/800 |
| 5,241,683 | 8/1993 | Okamoto | 395/800 |
| 5,257,392 | 10/1993 | Okamoto | 395/800 |
| 5,317,756 | 5/1994 | Komatsu et al. | 395/800 |
| 5,341,507 | 8/1994 | Terada et al. | 395/800 |
| 5,386,553 | 1/1995 | Fujita | 395/425 |
| 5,404,558 | 4/1995 | Okamoto | 395/800 |
| 5,448,745 | 9/1995 | Okamoto | 395/800 |

FOREIGN PATENT DOCUMENTS 2310788  12/1990  Japan .

OTHER PUBLICATIONS

"Microprocessors and Programmed Logic", Kenneth L. Short, 1987, pp. 71–72.

Primary Examiner—Thomas C. Lee
Assistant Examiner—Moustafa Mohamed Meky

[57] ABSTRACT

A data driven type information processor connects a data memory interface including a comparison unit and a memory accessing unit, and an external data memory device including a data memory unit. In response to reception of a data packet, the comparison units reads out memory data from the memory unit according to addressing based on address data stored in the input packet through the memory accessing unit, applies operation processing to the read out memory data according to an instruction code stored in the input packet, and updates memory data stored in the memory unit with operand data stored in the input packet according to the result of the operation.

10 Claims, 7 Drawing Sheets

| COMPARISON AND REPLACEMENT INSTRUCTION CODE | OPERAND DATA | |
|---|---|---|
| > irep | AD:ADDRESS DATA | WD:WRITE DATA |
| < irep | AD:ADDRESS DATA | WD:WRITE DATA |

FIG.4A  WHERE MEMORY DATA IS NOT REPLACED
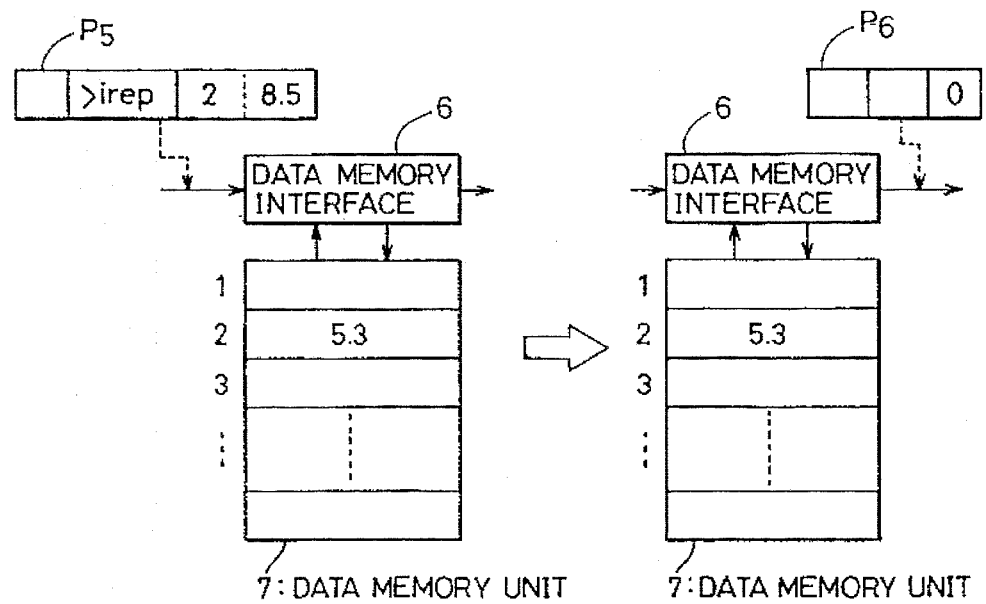
FIG.4B  WHERE MEMORY DATA IS REPLACED
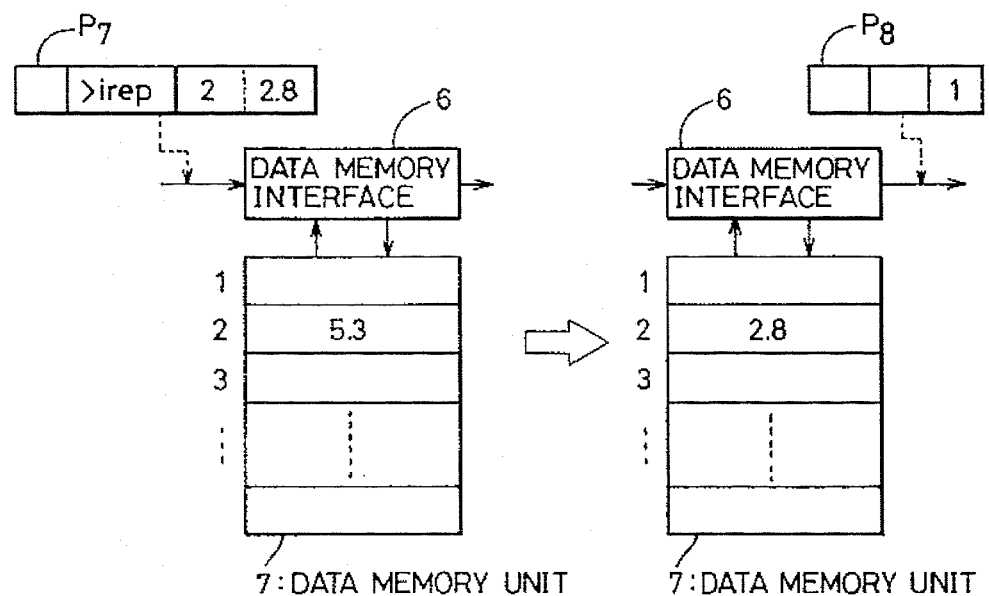

FIG.5A    IN CONVENTIONAL CASE    PRIOR ART
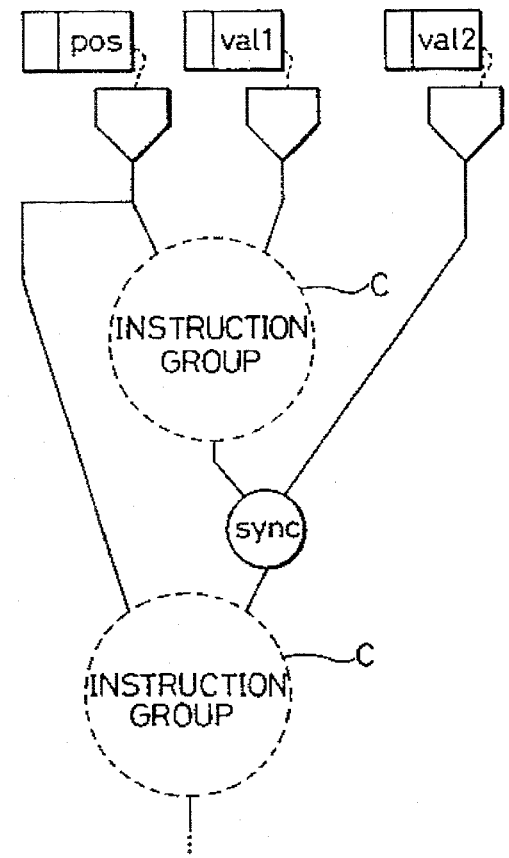
FIG.5B    IN THE PRESENT EMBODIMENT
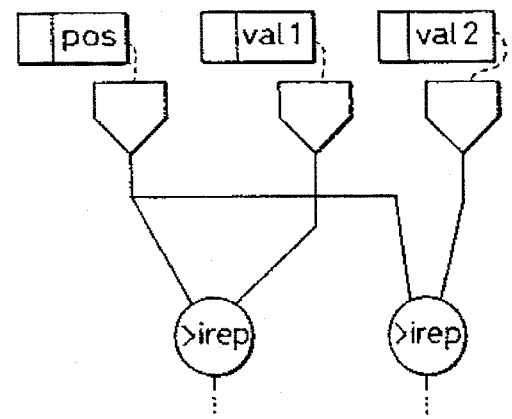

$F_1$: DESTINATION FIELD   $F_2$: INSTRUCTION FIELD
$F_3$: DATA 1 FIELD        $F_4$: DATA 2 FIELD

DATA DRIVEN PROCESSOR FOR READING DATA FROM STORAGE TO APPLY PRESCRIBED OPERATION IN RESPONSE TO OPERATION UPDATING INSTRUCTION AND UPDATING THE CONTENTS OF THE STORAGE

BACKGROUND OF THE INVENTION

1. Field of the Invention

The present invention relates to data driven type information processors, and particularly to a data driven type information processor to which an operation instruction capable of being processed in the processor is added, enhancing efficiency in accessing a data memory unit thereof.

2. Description of the Background Art

In a conventional von Neumann computer, various instructions are stored in advance as a program in a program memory, and addresses in the program memory are sequentially specified by a program counter, so that the instructions are sequentially read out, whereby the read instructions are executed.

A data driven type information processor is one of the non von-Neumann computers which does not have a concept of sequential execution of instructions by a program counter. In such a data driven type information processor, architecture based on parallel processing of instructions is employed. In the data driven type information processor, an operation can be executed upon collection of data to be operated, and in the case of some data a plurality of operations are to be simultaneously executed, so that programs are executed in parallel according to a natural flow of the data. As a result, it is considered that time required for operations is considerably reduced.

FIG. 6 is a block diagram showing the structure of one example of a conventional data driven type information processor.

FIG. 7 is a diagram showing a field structure of a data packet to be processed in a conventional information processor and in one embodiment of the present invention.

The data packet shown in FIG. 7 includes a destination field F1, an instruction field F2, a first data field F3 and a second data field F4. Destination information is stored in the field F1, instruction information is stored in the field F2, and operand data is stored in the field F3 or F4.

The information processor shown in FIG. 6 includes a program storage unit 100 including a program memory, a paired data detecting unit 2 including a queuing memory, an operation processing unit 3, and an input/output control unit 4. The information processor further includes an external data memory device 10 externally provided. FIG. 8 is a diagram showing a part of a data flow program stored in the program memory of the program storage unit 100 of FIG. 6. FIG. 9 is a diagram showing a part of data stored in the queuing memory of the paired data detecting unit 2 of FIG. 6.

In the memory of the program storage unit 100, the data flow program PR shown in FIG. 8 is stored in advance. The data flow program PR includes a plurality of destination information and instruction information. The program storage unit 100 reads out subsequent destination information and subsequent instruction information from the program PR stored in the memory by addressing based on destination information stored in an input data packet, stores the read out subsequent destination information and subsequent instruction information in the destination field F1 and the instruction field F2 of the input data packet, respectively, and outputs the data packet. Instruction information stored in the program storage unit 100 is roughly divided into information concerning the operation processing unit 3, and information concerning the external data memory device 10. An arithmetic operation instruction, a logical operation instruction, a comparison operation instruction are listed as the former, and read out instructions ISEL, SSEL and CSEL, and writing instructions IREP, SREP and CREP are listed as the latter.

ISEL is an instruction for reading out integer type data of 4 bytes.

SSEL is an instruction for reading out short word type data of 2 bytes.

CSEL is an instruction for reading out character type data of 1 byte.

IREP is an instruction for writing integer type data of 4 bytes.

SREP is an instruction for writing short word type data of 2 bytes.

CREP is an instruction for writing character type data of 1 byte.

The paired data detecting unit 2 carries out queuing for a data packet provided from the program storage unit 100 in a queuing memory 2a of FIG. 9. When instruction information of the input data packet from unit 100 indicates a binomial instruction, queuing operand data stored in an addressing area in the queuing memory 2a based on the destination information of the input packet is read out. At this time, if queuing operand data has already stored in the addressing area as shown in ① of FIG. 9, the queuing operand data is read out, and written in either of the field F3 or F4 in the input data packet, so that the input data packet storing two operand data is output. If queuing operand data is not stored in the addressing area of the memory 2a based on the destination information of the input data packet, operand data stored in the field F3 or F4 in the input data packet is written in the addressing area to wait for input of operand data to be paired therewith, as shown in ② of FIG. 9. The paired data detecting unit 2 thus carries out paired data detecting processing, in which two different data packets having the same destination information are detected by the queuing memory 2a, operand data in one of these data packets (the contents of the first data field F3 in FIG. 7) is stored in the second data field F4 of the other data packet and the other data packet is output. The paired data detecting unit 2 receives a data packet provided from the program storage unit 100 to output the received data packet without any modification, when instruction information of the received packet indicates a monomial instruction.

The operation processing unit 3 receives a data packet provided from the paired data detecting unit 2, and decodes instruction information stored in the received data packet to apply operation processing to operand data stored in the field F3 or F4 of the received data packet according to the decoded instruction information. The result of the operation is stored into the first data field F3 in the received data packet, and the data packet is output.

The input/output control unit 4 has an input/output control function and an output control function. The input/output control function is to confluent in good order data packets supplied from the outside of the information processor or the operation processing unit 3 while temporarily storing them, and sequentially output the same. The output control function is to provide a data packet received from the operation processing unit 3 to any one of the program storage unit 100, the external data memory device 10 and the outside of the information processor, based on destination information stored in the data packet.

In a thus structured data driven type information processor, program data read out from program storage unit 100 continues circulating as a data packet through program storage unit 100→paired data detecting unit 2→operation processing unit 3→input/output control unit 4 →program storage unit 100, so that operation processing based on the data flow program PR stored in program storage unit 100 is performed.

The external data memory device 10 includes a data memory interface 11 and a data memory unit 12. The data memory unit 12 stores data to be subjected to operation processing in the data driven type information processor. The data memory interface 11 accesses data memory unit 12 based on instruction information and operand the data stored in a data packet supplied through the input/output control unit 4. Data stored in the data memory unit is hereinafter referred to as memory data. The external data memory device 10 operates based on data stored in a data packet supplied after circulation through program storage unit 100→paired data detecting unit 2→operation processing unit 3→input/output control unit 4. Specifically, when the data memory interface 11 receives a packet from the input/output control unit 4, instruction information stored in the input packet is decoded, determining whether data is to be read out from the memory unit 12, or to be written into the memory unit 12. When the instruction information is one of the read out instructions described above (ISEL, SSEL and CSEL), the interface 11 addresses the memory unit 12 based on operand data (address data) stored in the field F3 of the received packet to read out memory data stored in the addressing area. The read out memory data is stored in the data field F3 of the received packet, and the received packet is applied to the input/output control unit 4. When the decoded instruction information is one of the writing instructions described above (IREP, SREP and CREP), the interface 11 addresses the data memory unit 12 based on operand data (address data) stored in the field F3 of the received packet to write operand data (data to be written) stored in the field F4 of the received packet into the addressing area.

In the instructions concerning external data memory device 10 in the conventional driven type information processor described above, an instruction for applying a designated address and designated data, and if memory data stored in an addressing area based on the designated address is larger than the designated data, then writing the designated data in the addressing area and providing 1, otherwise providing 0 without writing the data therein, and an instruction for applying a designated address and designated data, and if memory data stored in an addressing area based on the designated address is smaller than the designated data, then writing the designated data in the addressing area and providing 1, otherwise providing 0 without writing the data therein are not included. Hereinafter, these instructions are referred to as "comparison and replacement instructions", and processing performed according to these instructions is referred to as "comparison and replacement processing".

In carrying out "comparison and replacement processing" in the conventional data driven type information processor described above, the problem arises that numerous steps in the program concerning this processing prevents efficient processing in the information processor. This problem will now be described.

FIG. 10 is a data flow chart showing a conventional processing for a comparison and replacement instruction.

In the comparison and replacement processing shown in FIG. 10, the procedure for processing the instruction "apply a designated address and designated data, and if memory data stored in an addressing area based on the designated address is larger than the designated data, then write the designated data into the addressing area to output 1, otherwise output 0 without writing the data therein" is shown. Pentagonal symbols and circular symbols in FIG. 10 are termed nodes, in which input/output ports, operation instructions and the like are described. Node numbers #1–#6 are attached to respective nodes. The node numbers denote destination information, and the number of the node numbers is equal to the number of steps for the program stored in program storage unit 100. An operation instruction ">" is a logical operation instruction to compare left input data coming from the left of the node in which the instruction is described and right input data coming from the right of the node, and when: the left input data>the right input data, then output a true value "1", otherwise output a false value "0". An operation instruction "tg" is an operation instruction to hold and provide left input data if right input data is true, and erase the input data if the right input data is false. An operation instruction "fg" is an operation instruction to hold and provide left input data if right input data is false, and erase the input data if the right input data is true. An operation instruction "sync" is an operation instruction to synchronize left input data with right input data, and hold and output the same. As shown in FIG. 10, the operation instructions shown in #1–#6 are assembled to be an instruction group C. The operation instructions described in the nodes #1–#6 shown in FIG. 10 are paired with corresponding destination information #1–#6, respectively, to be stored in program storage unit 100 in advance.

The operation of the data driven type information processor of FIG. 6 in accordance with the data flow graph shown in FIG. 10 will now be described.

In operation, as shown in FIG. 10, the information processor receives a data packet P10 storing address data "pos" (designated address) and a data packet P11 storing write data "val" (designated data) to be written in an area of data memory unit 12 addressed by the address data "pos". Both of the data packets are processed in parallel in each unit of the data driven type information processor while program data stored in program storage unit 100 is read out. In other words, the operation processing in each node within the instruction group C proceeds through parallel execution of the instruction of each node in the instruction group C of FIG. 10. After the operation processing in the instruction group C, a data packet P12 storing comparison and replacement processing result data X (0 or 1) is obtained at an output node.

In the "comparison and replacement processing" in the conventional data driven type information processor, since at least six instruction nodes (program steps of a data flow program) are required as shown in FIG. 10, for example, the problem of preventing utilization efficiency of a memory in program storage unit 100 arises.

Moreover, in parallel execution of the "comparison and replacement processing" for the identical address of data memory unit 12, data stored in an addressing area of data memory unit 12 based on the address data "pos" tends to change during a period from execution of the instruction "isel" (node of #1) through execution of the instruction "irep" (node of #5), which prevents the parallel execution of the "comparison and replacement processing". Therefore, parallelism in operation processing which is characteristic of the data driven type information processor is impaired, so that the problem arises that the speed of operation processing in the information processor is considerably reduced in execution of the "comparison and replacement processing".

SUMMARY OF THE INVENTION

One object of the present invention is to provide a data driven type information processor which enhances speed in operating data stored in a memory to update the data stored in the memory according to the result of the operation.

Another object of the present invention is to provide a data driven type information processor capable of carrying out in parallel a plurality of processing in which data stored in a memory is operated to be updated according to the result of the operation.

In order to accomplish the above mentioned objects, the data driven type information processor in accordance with the present invention includes a data memory unit having a storage area for storing memory data therein, a program storage unit for storing a data flow program including a plurality of destination information and instruction information, a paired data detecting unit, an operation processing unit, and an input/output control unit.

The program storage unit reads out destination information and instruction information in a subsequent order from a data flow program according to destination information received with data, to output the read out destination information and instruction information together with the received data. Instruction information in the data flow program stored in the program storage unit includes an operation update instruction for reading out memory data from a storage area of the data memory unit, applying a prescribed operation to the same, and updating the contents of the storage area according to the result of the operation.

The paired data detecting unit sequentially receives the data sequentially provided from the program storage unit together with corresponding destination information and instruction information, detects two data having the same destination information, and correspondingly, makes the two data into paired data to output the same together with corresponding destination information and instruction information.

The operation processing unit receives the data provided from the paired data detecting unit together with corresponding destination information and instruction information, applies operation processing to the received data according to corresponding instruction information, and outputs the operation result data together with corresponding destination information and instruction information.

The input/output control unit receives the operation result data provided from the operation processing unit together with corresponding destination information and instruction information, and outputs the received operation result data together with the corresponding destination information and instruction information to the program storage unit, the outside of the information processor, or the data memory unit.

The data memory unit includes an operation update unit for receiving the above mentioned operation update instruction to execute the operation update instruction.

In the data driven type information processor thus structured in accordance with the present invention, in processing memory data of a storage area in the data memory unit with the operation update instruction, the instruction is initially read out from the program storage unit, and applied to the paired data detecting unit, so that data required for execution of the instruction is detected therein. The instruction and the data required for execution of the instruction provided from the paired data detecting unit are applied to the operation update unit of the data memory unit through the operation processing unit and the input/output control unit. The operation update unit receives the operation update instruction to execute the received instruction with the data applied together with the instruction. With one instruction, successive processing of reading out memory data from the storage area of the data memory unit, applying a predetermined operation to the read out memory data, and updating the contents of the storage area according to the result of the operation is thus allowed within the data memory unit, not through the operation processing unit. Therefore, other instructions cannot be executed during execution of the operation update instruction in the operation update unit, so that the contents of the storage area is prevented from changing until execution of the operation update instruction is completed. Consequently, in the data driven type information processor, a plurality of operation update instructions can be executed in parallel, enhancing the speed concerning operation update instructions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are diagrams showing the operation of the data memory interface and the change of the storage contents of the data memory unit in execution of the comparison and replacement instruction in accordance with one embodiment of the present invention.

FIG. 5A and 5B are diagrams showing the difference between the order of execution in a conventional information processor and that in an information processor of the present embodiment, in execution of a plurality of the comparison and replacement instructions with respect to the identical address of the data memory unit.

DESCRIPTION OF THE PREFERRED EMBODIMENTS

One embodiment of the present invention will hereinafter be described in detail with reference to the drawings.

Figure 1:
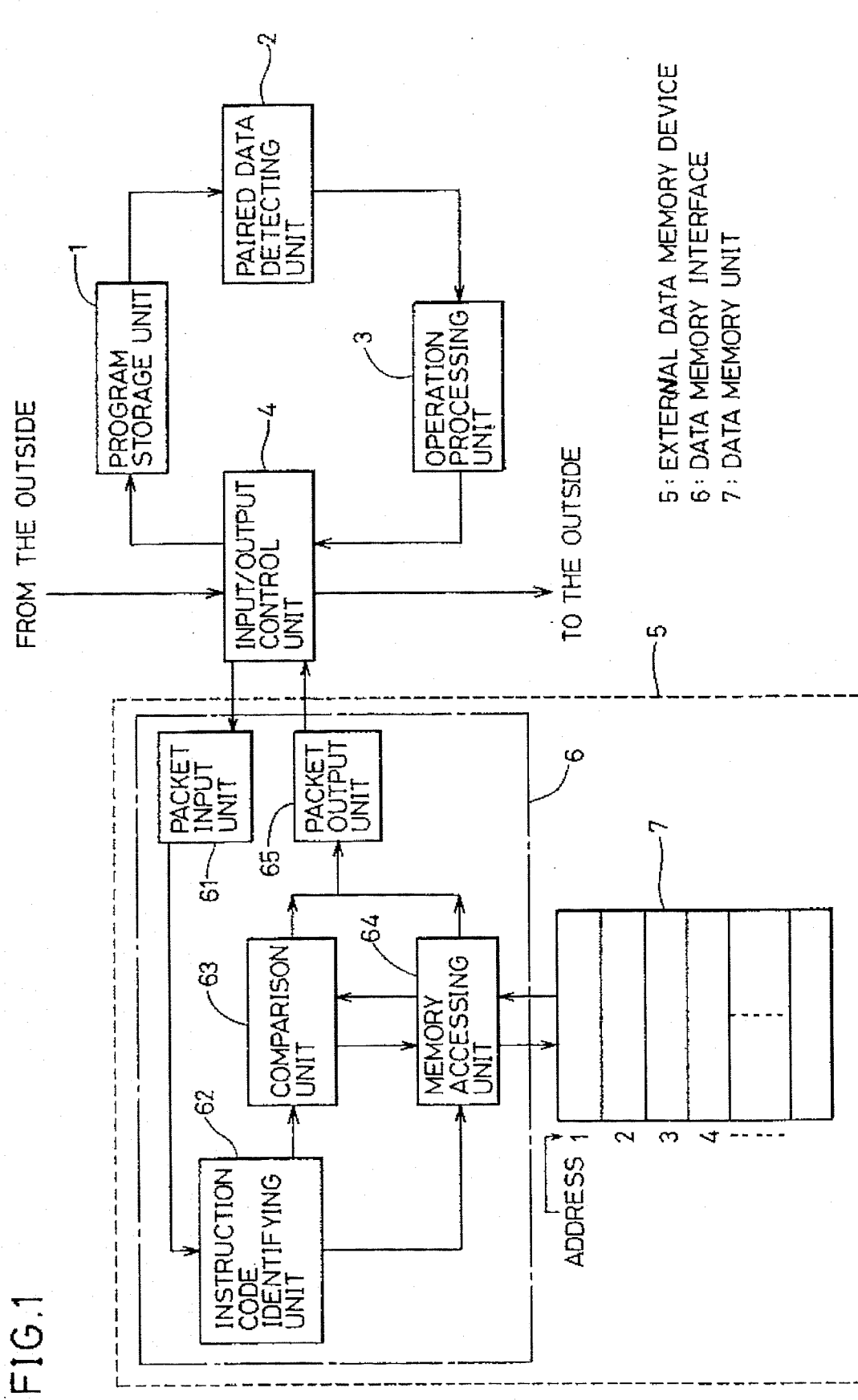
FIG. 1 is a block diagram showing the structure of a data driven type information processor in accordance with one embodiment of the present invention.

FIG. 1 is a block diagram showing the structure of a data driven type information processor in accordance with one embodiment of the present invention.

Figures 2, 3:
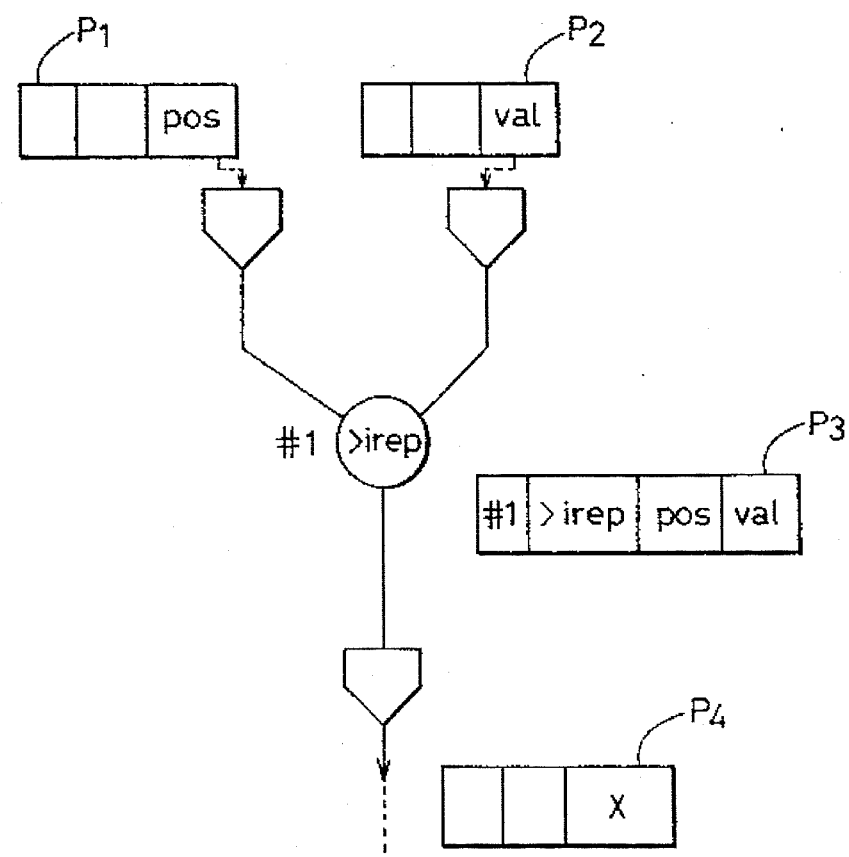
FIG. 2 is a diagram showing a comparison and replacement instruction in accordance with one embodiment of the present invention.
FIG. 3 is a diagram showing a data flow chart of a processing for the comparison and replacement instruction in accordance with one embodiment of the present invention.

FIG. 2 is a diagram showing a comparison and replacement instruction in accordance with one embodiment of the present invention.

FIG. 3 is a data flow chart of processing for the comparison and replacement instruction in accordance with one embodiment of the present invention.

The data driven type information processor in FIG. 1 includes a program storage unit 1, a paired data detecting unit 2, an operation processing unit 3, an input/output control unit 4 and an external data memory device 5.

Figure 6:
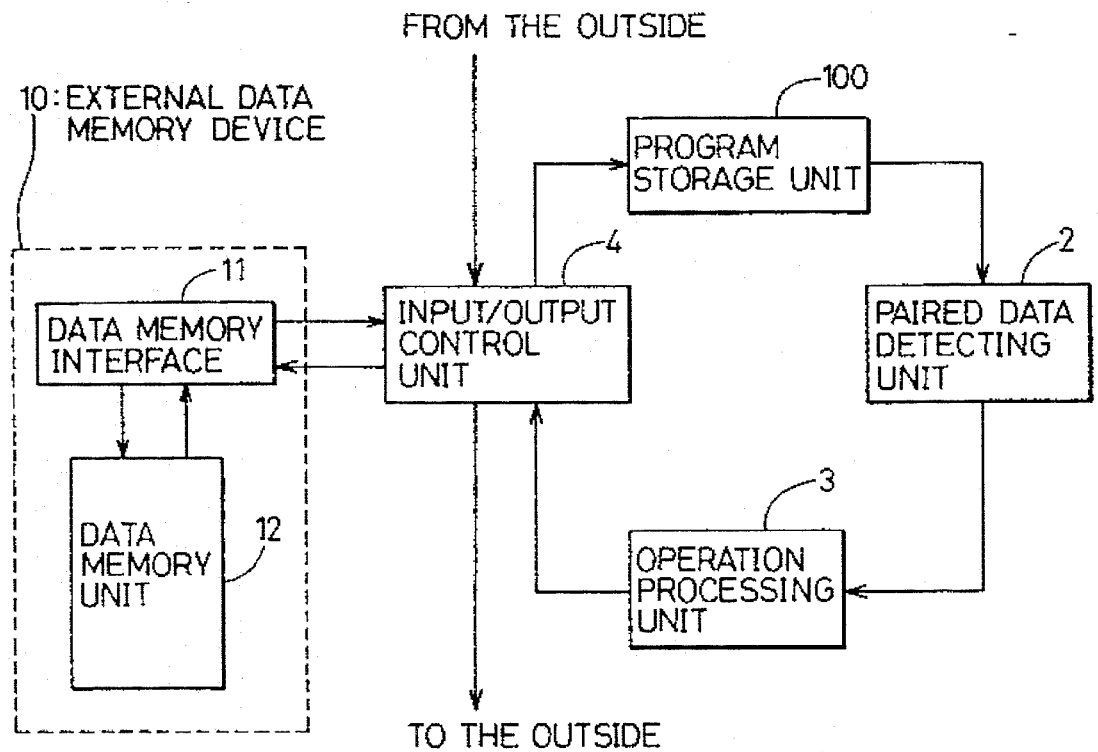
FIG. 6 is a block diagram showing one example of the structure of a conventional data driven type information processor.
Figure 7:
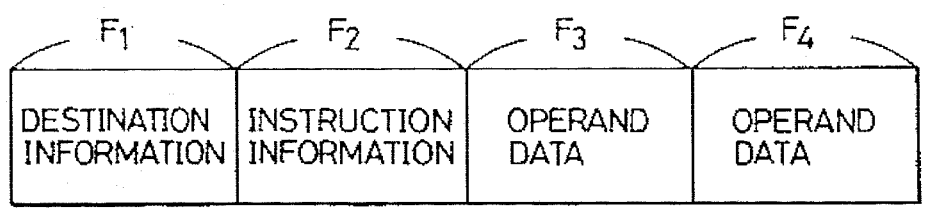
FIG. 7 is a diagram showing the field structure in a data packet to be processed in the data driven type information processor adapted to the conventional case and in the embodiment of the present invention.
Figure 8:
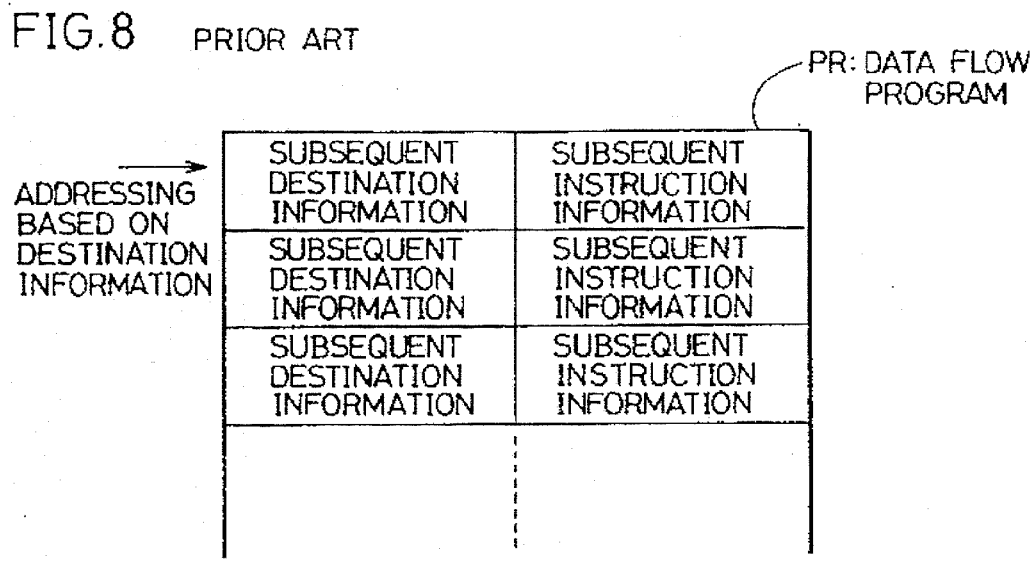
FIG. 8 is a diagram showing a part of a data flow program stored in the program memory of the program storage unit applied to the conventional case and the embodiment of the present invention.
Figure 9:
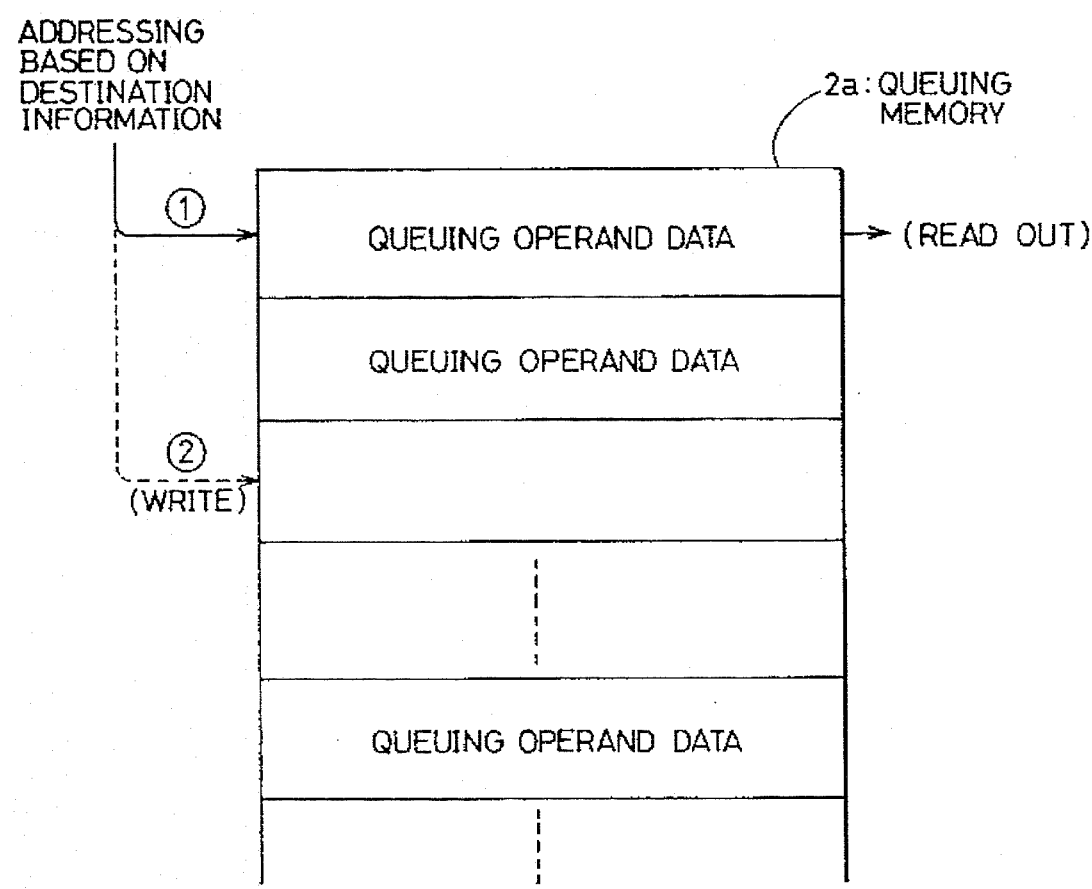
FIG. 9 is a diagram showing a part of data stored in the queuing memory of the paired data detecting unit adapted to the conventional case and the embodiment of the present invention.

Since the structure and operation of paired data detecting unit 2, operation processing unit 3 and input/output control units are the same as those shown in FIG. 6, the description thereof is not repeated.

External data memory device 5 includes a data memory interface 6 and a data memory unit 7. The structure and operation of data memory unit 7 is the same as those of data memory unit 12 shown in FIG. 6. Data memory interface 6 includes a packet input unit 61, an instruction code identifying unit 62, a comparison unit 63, a memory accessing unit 64 and a packet output unit 65. In addition to conventional functions, data memory interface 6 has a function of operating data stored in data memory unit 7 in response to a "comparison and replacement instruction" applied through input/output control unit 4 to update the data stored in memory unit 7 according to the result of the operation.

Referring to FIG. 2, the "comparison and replacement instruction" includes two instruction codes ">irep" and "<irep". The "comparison and replacement instruction" has address data AD and write data WD as operand data. The address data AD is data for accessing data memory unit 7. The write data WD is data for being compared with data stored in an area of memory unit 7 addressed based on the address data AD, to be written in the addressing area according to the result of the comparison. These instruction code and operand data are stored in a data packet to be applied from input/output control unit 4 to external data memory device 5.

Referring to FIG. 1, packet input unit 61 receives a data packet supplied from input/output control unit 4, and outputs the same to instruction code identifying unit 62. Identifying unit 62 receives the data packet from unit 61, identifies an instruction code stored in the field F2 of the input packet, and provides the input packet to either the comparison unit 63 or the memory accessing unit 64 according to the result of the comparison. As a result of identification in the identifying unit 62, if the instruction code is either of the instruction codes ">irep" or "<irep", the received packet is applied to the comparison unit 63, and if the instruction code is one of the above mentioned instruction codes ISEL, SSEL, CSEL, IREP, SREP, CREP for the external data memory device 5 except the instruction codes for comparison and replacement, then the received packet is applied to the memory access unit 64. The comparison unit 63 receives the data packet from the identifying unit 62, reads out the address data AD stored in the field F3 of the received packet, and applies the address data AD to memory accessing unit 64. The accessing unit 64 receives the address data AD from unit 63, addresses data memory unit 7 according to the received address data AD, and reads out the data stored in the addressing area to apply the address data AD to comparison unit 63. The comparison unit 63 applies comparison operation processing to the data supplied from the memory accessing unit 64 and the write data WD stored in the field F4 of the received packet according to the instruction code ">irep" or "<irep". In the case of the instruction code ">irep", if the memory data written in the addressing area is larger than the write data WD, the write data WD is applied to the memory access unit 64, and 1 is set in the field F3 of the received packet, so that the packet is provided to the packet output unit 65. In response to receiving the write data WD from the comparison unit 63, the accessing unit 64 writes the received write data WD into the above mentioned addressing area of memory unit 7. As a result of the comparison operation, if the memory data written in the addressing area is not larger than the write data WD, 0 is set in the field F3 of the received packet so that the packet is provided to the output unit 65. In the case of the instruction code "<irep", if the memory data written in the addressing area is smaller than the write data WD, the write data WD is applied to the memory accessing unit 64, and 1 is set in the field F3 of the received packet, so that the packet is provided to the packet output unit 65. In response to receiving of the write data WD, the accessing unit 64 writes the received write data WD into the above mentioned addressing area of memory unit 7. As a result of the comparison operation, if the memory data written in the addressing area is not smaller than the write data WD, 0 is set in the field F3 of the received packet, so that the packet is provided to the output unit 65.

When supplied with the packet from the identifying unit 62, the memory accessing unit 64 accesses the data memory unit 7 according to the instruction code ISEL, SSEL, CSEL, IREP, SREP, or CREP stored in the received packet, and stores the result of the access into the received packet to provide the packet to the packet output unit 65. The packet output unit 65 receives the data packet supplied from the comparison unit 63 or the memory accessing unit 64 to output the same to the input/output control unit 4 in the order of application.

As described above, in addition to the conventional processing function of the instruction codes for accessing the memory unit 7, the external data memory device 5 has a processing function of the instruction code ">irep" for applying a designated address and designated data, and if memory data written in an addressing area based on the designated address is larger than the designated data, then writing the designated data in the addressing area and providing 1, otherwise providing 0 without writing the designated data, and the instruction "<irep" for applying a designated address and designated data, and if memory data written in an addressing area based on the designated address is smaller than the designated data, then writing the designated data in the addressing area and providing 1, otherwise providing 0 without writing the designated data.

The processing operation of a comparison and replacement instruction in the data driven type information processor shown in FIG. 1 will now be described with reference to the data flow chart shown in FIG. 3. The operation for the instruction code ">irep" as a comparison and replacement instruction will be described here, and the operation for the instruction code "<irep" will not be described, since these operations are the same except the comparison operation in the data memory interface 6 described above. It is assumed that the instruction code ">irep" is stored in advance as program data in the program storage unit 1.

The flow chart of FIG. 3 is for processing the instruction code ">irep", and is constituted only of an instruction node with the node number #1.

Initially, a data packet P1 storing address data "pos" as operand data and a data packet P2 storing write data "val" as operand data, shown in FIG. 3, are sequentially applied to the program storage unit 1 via the input/output control unit 4. In the program storage unit 1, subsequent destination information and subsequent instruction information are read out according to addressing based on the destination information of the input packet P1, and are stored in the fields F1 and F2 of the input packet P1, respectively, so that the packet storing #1 as the destination information, ">irep" as instruction information, and the address data "pos" as operand data is output to the paired data detecting unit 2. In the paired data detecting unit 2, the address data "pos", which is operand data of the input packet, is stored in a queuing memory in response to the instruction code of the input packet being a binominal instruction (>irep), to wait for data to be paired with. In the program storage unit 1, subsequent destination information and subsequent instruction information are read out according to addressing based on the destination information of the subsequent input packet P2, so that the data packet storing #1 as destination information, ">irep" as instruction information, and the write data "val" as operand data is output to the paired data detecting unit 2. In the paired data detecting unit 2, the queuing memory is addressed according to the destination information of the input packet, paired data including the write data "val" and the address data "pos" which has already been waiting is detected, so that a data packet P3 storing #1 as destination information, ">irep" as instruction information, the address data "pos" and the write data "val" as operand data is provided to the operation processing unit 3. Operation processing unit 3 identifies the instruction code ">irep" of the input packet P3 as an instruction code concerning the external data memory device 5, so that the input packet P3 is output to the input/output control unit 4 without operation processing. Input/output control unit 4 receives the packet P3 to apply the received the packet to packet input unit 61 of the external data memory device 5 according to its destination information.

The packet input unit 61 of the external data memory device 5 applies the input packet P3 to the instruction code identifying unit 62. The identifying unit 62 identifies the instruction code ">irep" of the input packet P3 to output the input packet P3 to the comparison unit 63. The comparison unit 63 applies the address data "pos" stored in the input packet P3 to the memory accessing unit 64, and the accessing unit 64 addresses the data memory unit 7 based on the address data "pos". The memory data read out from the addressing area is applied to the comparison unit 63 through the memory accessing unit 64. The comparison unit 63 applies comparison operation processing to the read out memory data and the write data "val" stored in the input packet P3. According to the result of the operation, the memory data of the addressing area in the data memory unit 7 is updated with the write data "val" through the memory accessing unit 64, comparison result data X (0 or 1) is stored into the field F3 of the input packet P3, and the packet is provided to the packet output unit 65 as a packet P4. The packet output unit 65 receives the packet P4 to provide the same to the input/output control unit 4.

Figure 10:
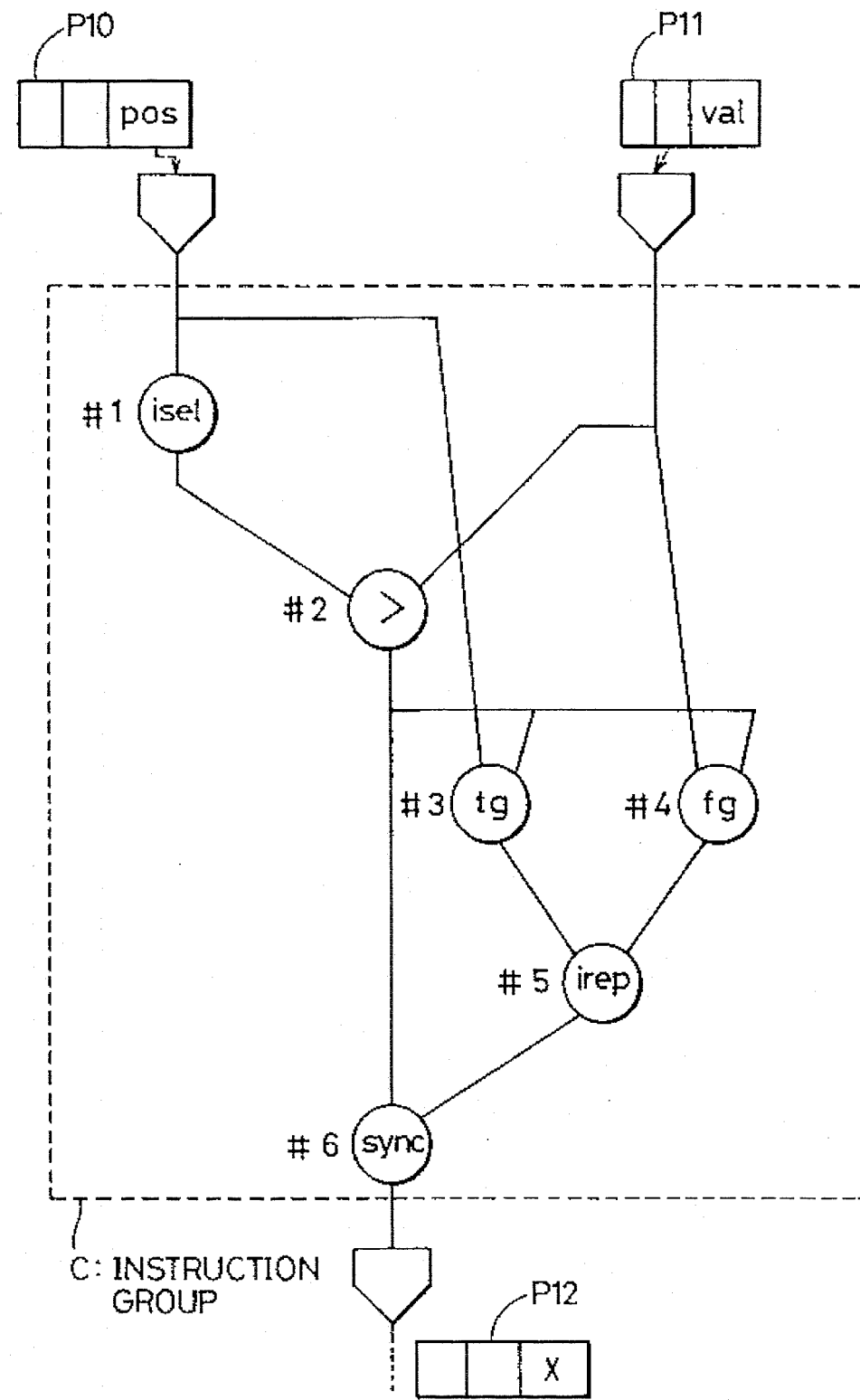
FIG. 10 is a data flow chart of the conventional processing for a comparison and replacement instruction.

As described above, in the comparison and replacement processing with the comparison and replacement instruction shown in FIG. 2, the six instruction nodes included in the instruction group C of the conventional flow graph in FIG. 10 are executed as one instruction node shown in FIG. 3. This means that the number of program steps for the comparison and replacement processing in program storage unit 1 is drastically reduced compared to the conventional case, so that processing speed in the information processor is enhanced, as well as utilization efficiency of a memory in the program storage unit 1.

Input/output data of the data memory interface 6 and change of the stored contents of the data memory unit 7 in the case of execution of the comparison and replacement instruction ">irep" will hereinafter be described.

First, the case where memory data in an addressing area of the data memory unit 7 is not replaced with the write data "val", as shown in FIG. 4A, will be described.

It is assumed that a data packet P5 storing the instruction code ">irep" as instruction information, 2 as the address data AD, 8.5 as the write data WD is processed in the external data memory device 5. Initially, as shown in FIG. 4A, when the data packet P5 is not applied to the external data memory device 5, a value 5.3 is assumed to be stored in the area of the address 2 in the data memory unit 7. When the data packet P5 is applied to the data memory the interface 6, interface 6 reads the value 5.3 stored in the area of the address 2 in the data memory unit 7 to compare the same with the value of the write data 8.5 stored in the input packet P5. Specifically, whether the relationship 5.3>8.5 holds or not is determined in the interface 6, and in this case, the comparison results in a false value "0". A data packet P6 storing the false value "0" is provided from the interface 6. At this time, the contents of the data memory unit 7 is not updated with the write data WD of the input packet P5.

Referring to FIG. 4B, the case where memory data in an addressing area of the data memory unit 7 is replaced with the write data "val" hereinafter be described.

It is assumed that a data packet P7 storing ">irep" as the instruction code, 2 as the address data AD, and 2.8 as the write data WD is processed in the external data memory device 5. Initially, as in FIG. 4B, when the packet P7 is not applied, a value 5.3 is stored in the area of the address 2 in the data memory unit 7. When the data packet P7 is applied to data memory interface 6, the interface 6 reads the value 5.3 stored in the area of the address 2 in the data memory unit 7 to compare the same with the value 2.8 of the write data WD stored in the input packet P7. Specifically, whether the relationship 5.3>2.8 holds or not is determined in the data memory interface 6. In this case, the comparison results in a true value "1", and a packet P8 storing the true value "1" in the data field is provided to the input/output control unit 4. In parallel, as shown in FIG. 4B, the memory data in the area of the address 2 in the data memory unit 7 is updated with the value 2.8 of the write data WD stored in the input packet P7.

Also in the case of execution of the instruction code "<irep", the operation thereof is the same as in the case of the instruction code ">irep" described above, except that the results of the comparison in the data memory interface 6 are inverted, respectively.

As described above, using one operation (one of the data packets P5 and P7), data stored in a desired address space in data memory unit 7 can be operated, so that the data stored in the address space can be updated (including initialization) with desired data according to the operation result.

In the data driven type information processor according to the present embodiment, a plurality of comparison and replacement instructions can be executed in parallel for the identical address space in the data memory unit 7, which cannot be allowed in the conventional processor. In this regard, description will be given with reference to FIGS. 5A and 5B.

Here, a comparison and replacement instruction by the write data WD=val 1 and a comparison and replacement instruction by the write data WD=val 2 are assumed to be executed for the area corresponding to the identical address "pos" in the data memory unit 7.

When two of the instruction groups C shown in FIG. 10 corresponding to the comparison and replacement instruction ">irep" are to be executed in parallel for the area corresponding to the identical address "pos" in the data memory unit 7, the order of execution of the instructions "isel" and "irep" is not fixed between the instruction groups C, so that the correct result of the processing cannot be obtained. Therefore, as shown in FIG. 5A, for example, the two instruction groups C concerning the identical address "pos" in the data memory unit must be executed in sequence, with the use of the instruction "sync".

On the other hand, in the present embodiment, comparison processing and replacement processing are successively executed not in the operation processing unit 3, but in the data memory interface 6, as described above, whereby the comparison and replacement instructions concerning the identical address "pos" in data memory unit 7, for example, can be executed in parallel as shown in FIG. 5B.

Although comparison and replacement processing alone is described in the present embodiment, the present invention is not limited to this. That is, the present invention is generally applicable to such processing for reading out data from the data memory unit 7, applying operation processing to the read out data, and writing the data in the data memory unit 7 according to the operation result to update the contents of the data memory unit 7.

As described above, in operation update processing in which data is read out from the data memory unit, and subjected to a prescribed operation, so that the contents of the storage area are updated in response to the operation result, one instruction enables this processing to be carried out, whereby the number of instructions to be executed with respect to the processing is drastically reduced compared to that in the conventional processor. Additionally, in the present embodiment, during execution of the instruction concerning the processing in the data memory interface 6, other instructions cannot be executed, ensuring that the storage contents in the data memory unit 7 are not changed during the execution whereby a plurality of operation update processing can be carried out in parallel, which is impossible in the conventional case. As a result, the processing speed of the data driven type information processor can be drastically enhanced.

In addition, the number of instructions in respect to the operation update processing is considerably reduced compared to that in the conventional case, so that the number of the program steps stored in program storage unit 1 is also reduced, enhancing the utilization efficiency of the storage capacity in the program storage unit 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processor, comprising:

data memory means having a storage area, for storing memory data in said storage area;

program storage means for storing data flow program including a plurality of destination information and instruction information, for reading out subsequent destination information and instruction information from said data flow program based on the destination information received together with data, and for outputting the read out destination information and instruction information together with said received data;

paired data detecting means for sequentially receiving said data sequentially provided from said program storage means together with corresponding destination information and instruction information, for detecting two data having same said destination information, and for outputting the two data as paired data together with said corresponding destination information and instruction information;

operation processing means for receiving the data provided from said paired data detecting means together with the corresponding destination information and instruction information, for determining whether or not said instruction information includes an operation updating instruction, for applying operation processing to said received data based on said corresponding instruction information if said instruction information does not contain an operation updating instruction, and for outputting operation result data indicating a result of the application processing or indicating that said instruction information contains an operation updating instruction, together with said corresponding destination information and instruction information; and input/output control means for receiving said operation result data provided from said operation processing means together with the corresponding destination information and instruction information, and for outputting said operation result data together with said received corresponding destination information and instruction information to one of said program storage means, the outside of the processor, and said data memory means, wherein, in response to said operation result data indicating that instruction information in said data flow program includes an operation updating instruction, reading out said memory data from said storage area to apply a prescribed operation to said memory data so that the contents of the storage area are updated in said data memory means, said data memory means further including operation update means for receiving said operation updating instruction and for executing the operation updating instruction in said data memory means.

2. The data driven type information processor according to claim 1, wherein said operation update means includes input means for receiving said operation result data provided from said input/output control means together with said corresponding destination information and instruction information, confirmation means for confirming that said instruction information received by said input means includes said operation updating instruction, and operation execution means for executing said operation updating instruction in response to the confirmation by said confirmation means.

3. The data driven type information processor according to claim 2, wherein said operation execution means includes data processing means for carrying out predetermined operation processing with said operation result data corresponding to said operation updating instruction received by said input means, based on the received operation updating instruction.

4. The data driven type information processor according to claim 3, wherein said data processing means addresses said storage area based on said operation result data, reads out said memory data from the addressing area, carries out said predetermined operation with the read out memory data based on said operation updating instruction, and updates the contents of said storage area in response to the result.

5. The data driven type information processor according to claim 4, wherein said operation result data includes address data for said addressing, and update data for updating the contents of said storage area, and said data processing means includes means for addressing said storage area based on said address data, reading out said memory data from the addressing area, carrying out said predetermined operation processing with the read out memory data based on said operation updating instruction, and writing said update data into said addressing area according to the result.

6. The data driven type information processor according to claim 5, wherein said data processing means outputs the data indicating the result of said predetermined operation processing to said input/output control means together with said destination information received corresponding to said operation updating instruction through said input means.

7. The data driven type information processor according to claim 4, wherein said data processing means outputs data indicating the result of said predetermined operation processing to said input/output control means together with said destination information received corresponding to said operation updating instruction through said input means.

8. A data driven type information processor, comprising:

program storage means for storing a data flow program including a plurality of destination information and instruction information, for reading out subsequent destination information and instruction information from said data flow program based on the destination information received together with data, and for outputting the read out destination information and instruction information together with said received data;

paired data detecting means for sequentially receiving said data sequentially provided from said program storage means together with said corresponding destination information and instruction information, for detecting two data having same said destination information, and for outputting the two data as paired data together with said corresponding destination information and instruction information;

first operation means for receiving the data provided from said paired data detecting means together with the corresponding destination information and instruction information, and for applying operation processing to said received data based on said instruction information; and second operation means having a storage area storing memory data, for receiving the data provided from said paired data detecting means together with the corresponding destination information and instruction information upon the instruction information including an operation updating instruction requiring access to the storage area, for reading out said memory data from said storage area based on said received instruction information to carry out a predetermined operation with said read out memory data, and for updating the contents of the storage area in response to the result of the operation in relation to said memory data, wherein instruction information is only processed and executed in said first operation means upon said instruction information failing to include an operation updating instruction.

9. A method for updating information in a storage area in a data memory unit in a data driver type information processor, comprising the steps of:

(a) storing memory data in the storage area;

(b) storing a data flow program including a plurality of destination information and instruction information in a program storage unit;

(c) reading out subsequent destination information and instruction information from said data flow program based on the destination information received with data;

(d) outputting the read out destination information and instruction information with said received data from said program storage unit;

(e) sequentially receiving said data sequentially provided from said program storage unit with corresponding destination information and instruction information;

(f) detecting two data having the same destination information;

(g) outputting the two data as paired data together with corresponding destination information and instruction information;

(h) applying operation processing to said paired data based on said corresponding instruction information in an operation processing unit, upon said instruction information failing to include an operation updating instruction;

(i) outputting operation result data, indicating a result of the operation processing of step (h) or indicating that said instruction information contains an operation updating instruction, together with said corresponding destination information and instruction information to at least one of said program storage unit, said data memory unit and outside the processor in accordance with said corresponding destination information;

(j) supplying the operation updating instruction to said data memory unit if said operation result data indicates that said instruction information includes an operation updating instruction;

(k) reading out said memory data from said storage area in response to the operation updating instruction supplied in step (j);

(l) applying said operation updating instruction in said data memory unit to said memory data and executing said operation updating instruction in response to said reading out in step (k); and (m) updating said storage area in accordance with a result of said applied and executed operation updating instruction.

10. The method according to claim 9, wherein said step (k) of reading out said memory data comprises the substeps of addressing said storage area in accordance with address data of said operation result data and reading out said memory data from an addressing area of said storage area.

* * * * *